United States Patent
Sugiura (10) Patent No.: US 11,820,172 B2
(45) Date of Patent: Nov. 21, 2023

(54) PNEUMATIC TIRE (71) Applicant: The Yokohama Rubber Co., LTD., Tokyo (JP)

(72) Inventor: Hiroki Sugiura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 457 days.

(21) Appl. No.: 16/614,318

(22) PCT Filed: Apr. 11, 2018

(86) PCT No.: PCT/JP2018/015273
§ 371 (c)(1),
(2) Date: Nov. 15, 2019

(87) PCT Pub. No.: WO2018/211874
PCT Pub. Date: Nov. 22, 2018

(65) Prior Publication Data
US 2020/0148003 A1 May 14, 2020

(30) Foreign Application Priority Data

May 16, 2017 (JP) .................................. 2017-097393

(51) Int. Cl.
| | |
|---|---|
| *B60C 1/00* | (2006.01) |
| *C08K 3/011* | (2018.01) |
| *B60C 11/03* | (2006.01) |
| *C08K 3/04* | (2006.01) |
| *C08K 3/06* | (2006.01) |
| *C08L 7/00* | (2006.01) |
| *C08L 9/00* | (2006.01) |
| *C08L 25/10* | (2006.01) |

(52) U.S. Cl.
CPC ............ *B60C 1/0016* (2013.01); *B60C 11/03* (2013.01); *C08K 3/011* (2018.01); *C08K 3/04* (2013.01); *C08K 3/06* (2013.01); *C08L 7/00* (2013.01); *C08L 9/00* (2013.01); *C08L 25/10* (2013.01); *B60C 2011/0355* (2013.01); *C08K 2201/006* (2013.01); *C08L 2205/03* (2013.01)

(58) Field of Classification Search
CPC .... C08L 25/10; C08L 9/06; C08L 7/00; C08L 9/00; C08L 2205/02; C08L 2205/03; B60C 11/03; B60C 1/0016; B60C 11/01; B60C 1/00; B60C 2011/0355; C08K 3/011; C08K 3/04; C08K 3/06; C08K 2201/006
See application file for complete search history.

(56) References Cited

U.S. PATENT DOCUMENTS

| | | | |
|---|---|---|---|
| RE46,184 E | * | 10/2016 | Kondo ..................... C08K 3/36 |
| 2006/0266454 A1 | | 11/2006 | Sandstrom et al. |
| 2011/0144236 A1 | * | 6/2011 | Mihara ................... C08L 15/00 |
| | | | 523/158 |
| 2015/0299436 A1 | | 10/2015 | Shin et al. |
| 2016/0159160 A1 | * | 6/2016 | Kaji ..................... B60C 11/0309 |
| | | | 152/209.21 |
| 2016/0221397 A1 | * | 8/2016 | Maehara ............. B60C 11/0309 |
| 2017/0088699 A1 | * | 3/2017 | Iwakuni ................... C08L 9/00 |
| 2018/0141378 A1 | | 5/2018 | Park et al. |

FOREIGN PATENT DOCUMENTS

| | | |
|---|---|---|
| EP | 3 327 080 | 5/2018 |
| JP | H01-314605 | 12/1989 |
| JP | H05-117450 | 5/1993 |
| JP | 2012-007145 | 1/2012 |
| JP | 2013-237724 | 11/2013 |
| JP | 2015-206029 | 11/2015 |
| JP | 2017-222315 | 12/2017 |
| WO | WO 2017/164329 | 9/2017 |
| WO | WO 2017/217244 | 12/2017 |
| WO | WO 2018/002996 | 1/2018 |
| WO | WO 2018/003526 | 1/2018 |

OTHER PUBLICATIONS

Wang et al., 2003, Carbon Black, Encyclopedia of Polymer Science and Technology. (Year: 2003).*
International Search Report for International Application No. PCT/JP2018/015273 dated Jul. 10, 2018, 4 pages, Japan.

* cited by examiner

*Primary Examiner* — Angela C Scott
(74) *Attorney, Agent, or Firm* — Thorpe North & Western (57) ABSTRACT

A pneumatic tire comprises a tread rubber with a groove depth at a shoulder portion that comes into contact with a road surface of 10 mm or greater. A rubber composition of the tread rubber contains: 60 to 70 parts by mass of carbon black having a nitrogen adsorption specific surface area of 70 to 130 m²/g, 0.5 parts or greater by mass of sulfur, and a vulcanization accelerator per 100 parts by mass of diene rubber including 50 to 70 mass % of styrene-butadiene rubber, 20 to 30 mass % of butadiene rubber, and 10 to 30 mass % of natural rubber. The diene rubber has an average glass transition temperature of −65° C. or lower. A ratio of a compounded amount of the vulcanization accelerator to a compounded amount of the sulfur is 1.0 to 1.3. The tread rubber has a rubber hardness of 65 to 70 at 20° C.

4 Claims, 3 Drawing Sheets

PNEUMATIC TIRE

TECHNICAL FIELD

The present technology relates to a pneumatic tire having enhanced travel failure properties over poor roads, wear resistance, cut and chipping resistance, and low heat build-up.

BACKGROUND ART

In addition to excellent travel failure properties over poor roads, it is important for a pneumatic tire for off-road travel to be superior in cut and chipping resistance and wear resistance. Furthermore, the tires are fitted on heavy vehicles and used in harsh environments. Accordingly, it is important to reduce heat build-up, which affects the durability of the tires.

For a pneumatic tire for off-road travel, when tread rubber is made soft, travel failure properties over poor roads and cut and chipping resistance are improved, but wear resistance and heat build-up are degraded. When a large amount of filler with excellent wear resistance is blended to enhance wear resistance, heat build-up is degraded. Furthermore, the tread rubber has conflicting properties such that wear resistance is degraded when the filler is reduced in order to reduce heat build-up.

Japan Unexamined Patent Publication No. H05-117450 describes a tread rubber composition for a large pneumatic tire for poor roads, which has an elongation at break of 500% or greater, spring hardness of 60 or greater, and impact resilience of 40 or greater, and the tread rubber composition is obtained by compounding carbon black having a nitrogen adsorption specific surface area of 150 to 200 $m^2/g$ with a rubber component including a styrene-butadiene copolymer, natural rubber and/or polyisoprene rubber, and polybutadiene rubber. This tread rubber composition has enhanced cut and chipping resistance while maintaining wear resistance and heat build-up suppression.

However, in recent years, consumers have required higher performance from pneumatic tires for off-road travel, and tires have been required to have better travel failure properties over poor roads, wear resistance, cut and chipping resistance, and low heat build-up.

SUMMARY

The present technology provides a pneumatic tire having travel failure properties over poor roads, wear resistance, cut and chipping resistance, and low heat build-up which are enhanced beyond conventional levels.

A pneumatic tire according to an embodiment of the present technology comprises:
  a tread rubber with a groove depth at a shoulder portion that comes into contact with a road surface is 10 mm or greater; wherein
  a rubber composition of the tread rubber contains:
  60 to 70 parts by mass of carbon black having a nitrogen adsorption specific surface area of 70 to 130 $m^2/g$, 0.5 parts by mass or greater of sulfur, and a vulcanization accelerator per 100 parts by mass of diene rubber including 50 to 70 mass % of styrene-butadiene rubber, 20 to 30 mass % of butadiene rubber, and 10 to 30 mass % of natural rubber;
  the diene rubber has an average glass transition temperature of −65° C. or lower;
  a ratio Ma/Ms of a compounded amount Ma parts by mass of the vulcanization accelerator to a compounded amount Ms parts by mass of the sulfur is 1.0 to 1.3; and
  the tread rubber has a rubber hardness of 65 to 70 at 20° C.

In the pneumatic tire according to an embodiment of the present technology, the tread rubber is made of the aforementioned specific rubber composition and the groove depth of the tread rubber, at the shoulder portion that comes into contact with a road surface is 10 mm or greater. Thus, the pneumatic tire can have travel failure properties over poor roads, wear resistance, cut and chipping resistance, and low heat build-up which are improved beyond conventional levels.

In the present technology, preferably 1.0 to 3.0 parts by mass of the sulfur is compounded per 100 parts by mass of the diene rubber, and thus the tire can be excellent in cut and chipping resistance.

Additionally, the tread rubber preferably comprises a ground contact surface consisting of block-shaped land portions defined by grooves continuously provided in circumferential and width directions of the tire, and thus the tire can be more superior in travel failure properties over poor roads and wear resistance.

DETAILED DESCRIPTION

Figure 1:
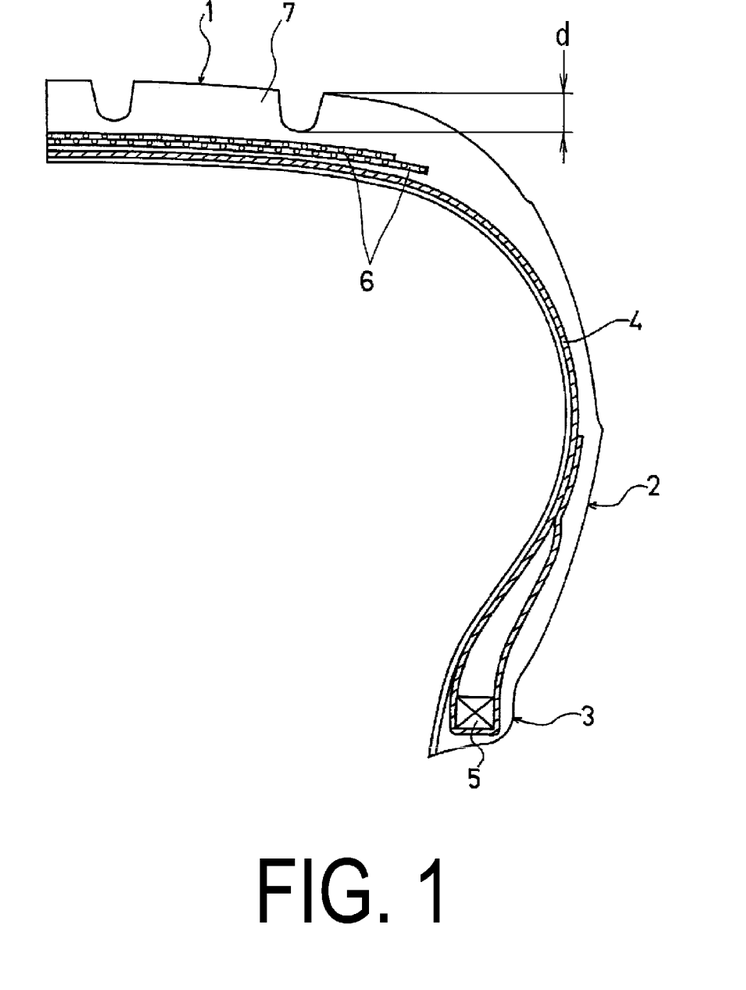
FIG. 1 is a cross-sectional view in a meridian direction, illustrating an example of a pneumatic tire according to an embodiment of the present technology.

In FIG. 1, a pneumatic tire includes a tread portion 1, sidewall portions 2, and bead portions 3. A carcass layer 4 is mounted between the right and left bead portions 3, 3, and each of both ends of the carcass layer 4 is folded back around a bead core 5 from the inner side to the outer side of the tire. A belt layer 6 in a two-layer structure is disposed on the outer side of the carcass layer 4 in the tread portion 1 in the tire radial direction, and a tread rubber 7 is disposed outward of the belt layer 6 on the outermost side thereof. The tread rubber 7 has a groove depth d of 10 mm or greater at a shoulder portion that comes into contact with the road surface. The groove depth d of the tread rubber 7 at the shoulder portion is set to 10 mm or greater to give excellent travel failure properties over poor roads. The groove depth d at the shoulder portion is preferably 12 to 19 mm.

The tread rubber 7 includes a rubber composition. The rubber composition may be referred to as a tread rubber composition. A rubber component of the tread rubber composition is diene rubber of natural rubber, butadiene rubber, and styrene-butadiene rubber. 50 to 70 mass % of styrene-butadiene rubber, 20 to 30 mass % of butadiene rubber, and 10 to 30 mass % of natural rubber are contained in 100 mass % of the diene rubber.

The styrene-butadiene rubber content is 50 to 70 mass % and preferably 52 to 67 mass %. When the styrene-butadiene rubber content is less than 50 mass %, travel failure properties over poor roads deteriorate. When the styrene-butadiene rubber content is greater than 70 mass %, heat build-up increases and thus cut and chipping resistance cannot be sufficiently enhanced. The type of styrene-butadiene rubber is not particularly limited and may be either emulsion-polymerized styrene-butadiene rubber or solution-polymerized styrene-butadiene rubber. Further, more than one type of styrene-butadiene rubber may be used. Emulsion-polymerized styrene-butadiene rubber is preferably used because it further increases the tensile strength at break of the rubber composition and provides excellent cut and chipping resistance.

The butadiene rubber content is 20 to 30 mass % and preferably 22 to 28 mass %. When the butadiene rubber content is less than 20 mass %, travel failure properties over poor roads deteriorate and heat build-up increases. When the butadiene rubber content is greater than 30 mass %, cut and chipping resistance cannot not be sufficiently improved.

Of 100 mass % of the diene rubber, the natural rubber content is 10 to 30 mass % and preferably 12 to 22 mass %. When the natural rubber content is less than 10 mass %, cut and chipping resistance cannot be sufficiently improved. When the natural rubber content is greater than 30 mass %, travel failure properties over poor roads cannot be maintained at a preferable level.

In the present technology, the diene rubber of natural rubber, butadiene rubber, and styrene-butadiene rubber has an average glass transition temperature (Tg) of −65° C. or lower, preferably −80° C. to −65° C., and more preferably −78° C. to −67° C. The glass transition temperature (Tg) of the rubber component is set to −65° C. or lower, and thus heat build-up can be reduced.

In the specification, the glass transition temperature (Tg) of the diene rubber is a total of values obtained by multiplication of glass transition temperatures of the constituent diene rubbers by mass fractions thereof (an average mass value of the glass transition temperatures). In addition, a total of the mass fractions of all of the diene rubbers is set to 1. In addition, the glass transition temperature (Tg) of each diene rubber is the glass transition temperature of the diene rubber in a state in which an oil-extended component (oil) is not contained. For the glass transition temperature (Tg), a thermograph is measured by differential scanning calorimetry (DSC) at a rate of temperature increase of 20° C./minute and the temperature at the midpoint of the transition region is defined as the glass transition temperature.

In the tread rubber composition, a total compounded amount of the natural rubber, the butadiene rubber, and the styrene-butadiene rubber is 100 mass % of the diene rubber. In a case where diene rubber other than natural rubber, butadiene rubber, and styrene-butadiene rubber is contained as a diluting material or a base rubber of a master batch when various compounding agents are added to the tread rubber composition, the use of such compounding agents is not excluded, and the compounding agents may be used as long as the object of the present technology is not impaired by the use of the compounding agents. An example of other diene rubbers may include, for example, isoprene rubber, butyl rubber, acrylonitrile-butadiene rubber, and the like.

Carbon black is compounded into the tread rubber composition, and thus rubber strength and rubber hardness of the rubber composition are increased and wear resistance can be enhanced. The compounded amount of the carbon black is 60 to 70 parts by mass and preferably 62 to 68 parts by mass per 100 parts by mass of the diene rubber. When the compounded amount of the carbon black is less than 60 parts by mass, rubber hardness, rubber strength, and wear resistance of the rubber composition deteriorate. When the compounded amount of the carbon black is greater than 70 parts by mass, heat build-up increases and tire durability decreases.

For the carbon black, the grade classified by ASTM D1765 is preferably ISAF (Intermediate Super Abrasion Furnace) grade. In addition, the carbon black has a nitrogen adsorption specific surface area of 70 to 130 $m^2/g$ and preferably 95 to 125 $m^2/g$. When the nitrogen adsorption specific surface area is less than 70 $m^2/g$, mechanical properties such as rubber hardness, rubber strength, or the like of the rubber composition are decreased, and thus wear resistance deteriorates. When the nitrogen adsorption specific surface area is greater than 130 $m^2/g$, heat build-up increases and tire durability decreased. The nitrogen adsorption specific surface area of the carbon black is measured in accordance with JIS (Japanese Industrial Standard) K6217-2.

In the present technology, a filler other than carbon black may be compounded. An example of other fillers may include, for example, silica, clay, mica, talc, calcium carbonate, aluminum hydroxide, aluminum oxide, titanium oxide, and the like. Of the fillers, calcium carbonate, clay, and aluminum oxide are preferable fillers. Other fillers are compounded, and thus the mechanical properties of the rubber composition can be further improved, and the balance between low heat build-up, cut resistance, and processability when a tire is produced can be improved.

The tread rubber composition includes sulfur and a vulcanization accelerator. In the present specification, the compounded amount of the sulfur and the compounded amount of the vulcanization accelerator are respectively Ms part by mass and Ma part by mass per 100 parts by mass of the diene rubber. The compounded amount Ms of sulfur is 0.5 part by mass or greater, preferably 1.0 to 3.0 parts by mass, and more preferably 1.1 to 2.0 parts by mass. When the compounded amount Ms of sulfur is less than 0.5 part by mass, the tread rubber composition is poor in cut and chip resistance and wear resistance, and in addition, heat build-up increases.

The compounded amount Ma of the vulcanization accelerator is determined by the relationship with the compounded amount Ms of sulfur. In other words, a ratio Ma/Ms of the compounded amount Ma part by mass of the vulcanization accelerator to the compounded amount Ms part by mass of sulfur needs to be 1.0 to 1.3, and is preferably 1.1 to 1.3. When the ratio Ma/Ms of the compounded amount of the vulcanization accelerator to compounded amount of the sulfur is less than 1.0, heat build-up increases. Furthermore, when the ratio Ma/Ms of the compounded amount of the vulcanization accelerator to the compounded amount of the sulfur is greater than 1.3, travel failure properties over poor roads decreases, and in addition, cut and chipping resistance cannot be sufficiently improved.

In the present technology, the rubber hardness of the tread rubber at 20° C. is 65 to 70 and preferably 66 to 69. The rubber hardness of the tread rubber is set to be 65 or greater and thus wear resistance can be improved. In addition, the rubber hardness is set to be 70 or smaller and thus travel failure properties over poor roads can be improved.

The pneumatic tire according to an embodiment of the present technology can be suitably used as a pneumatic tire for off-road travel. The tread pattern of the pneumatic tire is not particularly limited; however, the ground contact surface of the tread rubber is preferably formed of block-shaped land portions defined by grooves continuously disposed in the tire circumferential direction and in the tire width direction. Even in a tread pattern formed of ribs and blocks that are land portions continuously disposed in the tire circumferential direction, wear resistance and cut and chipping resistance can be improved. However, the tread pattern formed only of block-shaped land portions, and thus travel failure properties over poor roads can be further improved.

Figure 2:
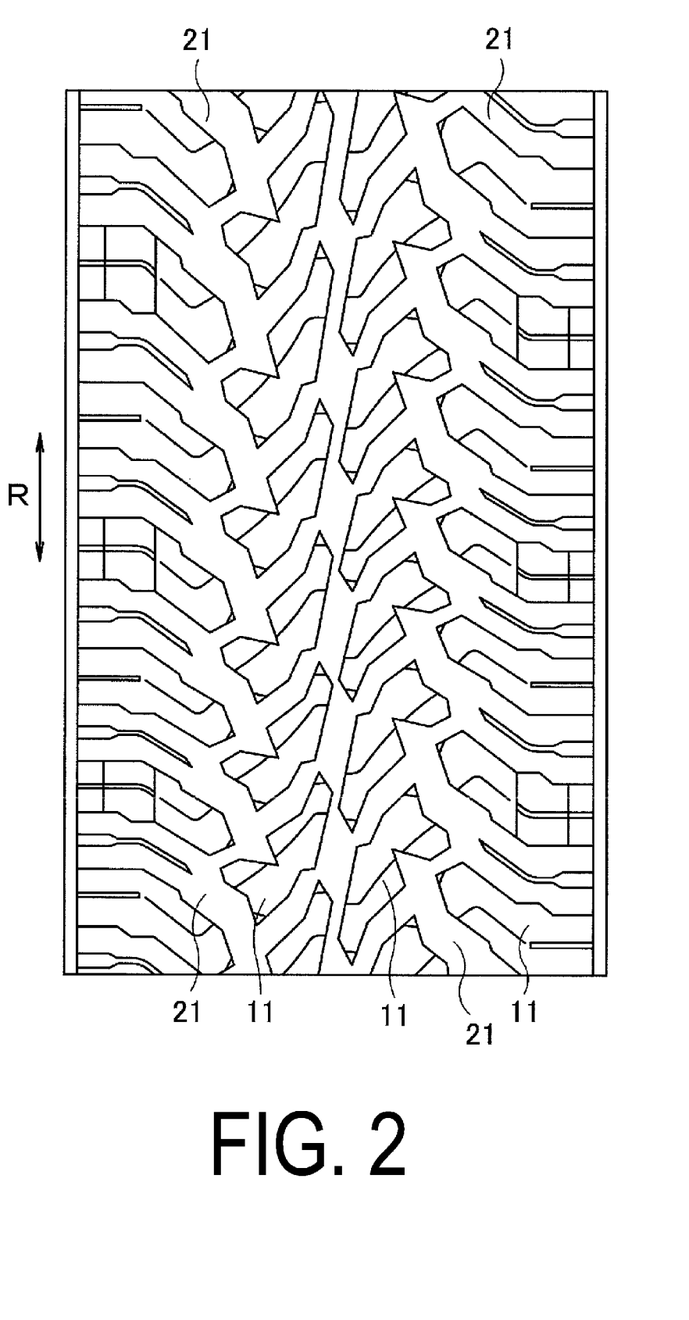
FIG. 2 is an explanatory diagram illustrating an example of a tread pattern of a pneumatic tire according to an embodiment of the present technology.

FIG. 2 is an explanatory diagram illustrating a block pattern in which the ground contact surface of the tread rubber is defined by grooves continuously disposed in the tire circumferential direction and in the tire width direction. In an example of FIG. 2, all of the land portions are formed of blocks 11. Note that in the present technology, the depth of each of grooves 21 at the shoulder portion that comes into contact with a road surface is 10 mm or greater. In a tread pattern illustrated in FIG. 3, the contact surface of the tread rubber is formed of blocks 11 and ribs 13. In the tread pattern, the depth of the groove 21 at the shoulder portion that comes into contact with a road surface needs to be 10 mm or greater. The depth of the groove 21 at the shoulder portion is 10 mm or greater, and thus travel failure properties over poor roads such as running performance on mud roads can be improved.

Embodiments according to the present technology are further described below by Examples. However, the scope of the present technology is not limited to these Examples.

EXAMPLE

Using in common compounding agents indicated in Table 3, components, excluding sulfur and a vulcanization accelerator, of twenty-one types of tread rubber compositions indicated in Tables 1 and 2 (Examples 1 to 5, Standard Example, and Comparative Examples 1 to 15) were kneaded for five minutes with a 1.8 L sealed mixer at 170° C., and then the mixture was discharged as a master batch. Then, sulfur and a vulcanization accelerator were added to the master batch and the master batch was kneaded with an open roll. Thus, the twenty-one types of rubber compositions were prepared. The added amounts of the common compounding agents indicated in Table 3 are represented by parts by mass per 100 parts by mass of the diene rubber indicated in Tables 1 and 2. In each of the rubber compositions, the average glass transition temperature of the diene rubber was calculated and indicated in the "Average Tg" row of Tables 1 and 2. Further, the ratio Ma/Ms of the compounded amount Ma part by mass of the vulcanization accelerator to the compounded amount Ms part by mass of the sulfur was calculated and indicated in the "Compounded ratio Ma/Ms" row of Tables 1 and 2.

Test pieces were produced by vulcanizing the obtained twenty-one types of rubber compositions in a mold having a certain shape at 160° C. for 20 minutes, and rubber hardness, tensile strength at break (cut and chipping resistance), Lambourn abrasion test (wear resistance), and tan δ at 60° C. (heat build-up) were evaluated in accordance with the methods described below.

Rubber Hardness

The rubber hardness of the obtained test piece was measured at a temperature of 20° C. with a type A durometer in accordance with JIS K6253. The obtained results are indicated in the "Rubber hardness" row of Tables 1 and 2.

Tensile Strength at Break (23° C.)

A dumbbell-shaped JIS No. 3 test piece was cut out of the obtained test pieces in accordance with JIS K6251. Tensile testing was performed at 23° C. and at a pulling speed of 500 mm/min, and the strength at break was measured. The obtained results are represented by index values with the value of Standard Example being assigned 100 and are indicated in the "Cut and chipping resistance" row of Tables 1 and 2. Larger index values indicate larger tensile strength at break and superior cut and chipping resistance. In the present specification, an index value for cut and chip resistance of 102 or greater is considered acceptable.

Lambourn Abrasion (Wear Resistance)

The amount of wear of the obtained vulcanized rubber test pieces was measured in accordance with JIS K6264 with the use of a Lambourn abrasion test machine (available from Ueshima Seisakusho Co., Ltd.) under the following conditions: temperature of 20° C., load of 15N, slip rate of 50%, and test time of 10 minutes. The obtained results are represented by index values with the reciprocal of the value of Standard Example being assigned 100 and are indicated in the "Wear resistance" rows of Tables 1 and 2. Larger index values indicate superior wear resistance. In the present specification, an index value for wear resistance of 96 or greater is considered acceptable. tan δ at 60° C. (heat build-up)

Using a viscoelastic spectrometer, available from Toyo Seiki Seisaku-sho, Ltd., the loss tangent, tan δ at a temperature of 60° C. of the obtained test pieces was measured in accordance with JIS K6394 under the following conditions: initial strain of 10%, amplitude of +/−2%, and frequency of 20 Hz. The obtained results are represented by index values obtained by calculating the reciprocal of the value of the obtained tan δ with the index value of Standard Example being assigned 100 and are indicated in the tan δ (60° C.) rows of Tables 1 and 2. Larger index values indicate that the heat build-up (tan δ at 60° C.) is smaller, which means that the tire temperature is inhibited from increasing due to heat build-up during running on rough roads and thus the tire durability can be improved. In the present specification, an index value for heat build-up of 96 or greater is considered acceptable.

Pneumatic tires (tire size: 265/70R17) were vulcanization-molded by using the obtained tread rubber composition as a tread rubber. The tread pattern of the pneumatic tires is a block pattern illustrated in FIG. 2 or a rib and block pattern illustrated in FIG. 3. Additionally, the groove depth of the tread rubber at the shoulder portion that comes into contact with a road surface is indicated in the "Tread groove depth" rows of Tables 1 and 2. Using the obtained pneumatic tires, travel failure properties over poor roads were tested by the method described below.

Travel Failure Properties Over Poor Roads

The obtained pneumatic tires were mounted on standard rims, and a test vehicle was driven on a mud road of a test course. Then, the steering stability at the time of driving was scored with a sensory evaluation performed by experienced panelists. The obtained results are represented by index values with the value of Standard Example being assigned 100 and are indicated in the "Travel failure properties over poor roads" rows of Tables 1 and 2. Larger index values indicate that the tire is superior in travel failure properties over poor roads. In the present specification, an index value for travel failure properties over poor roads of 96 or greater is considered acceptable.

TABLE 1

Figure 3:
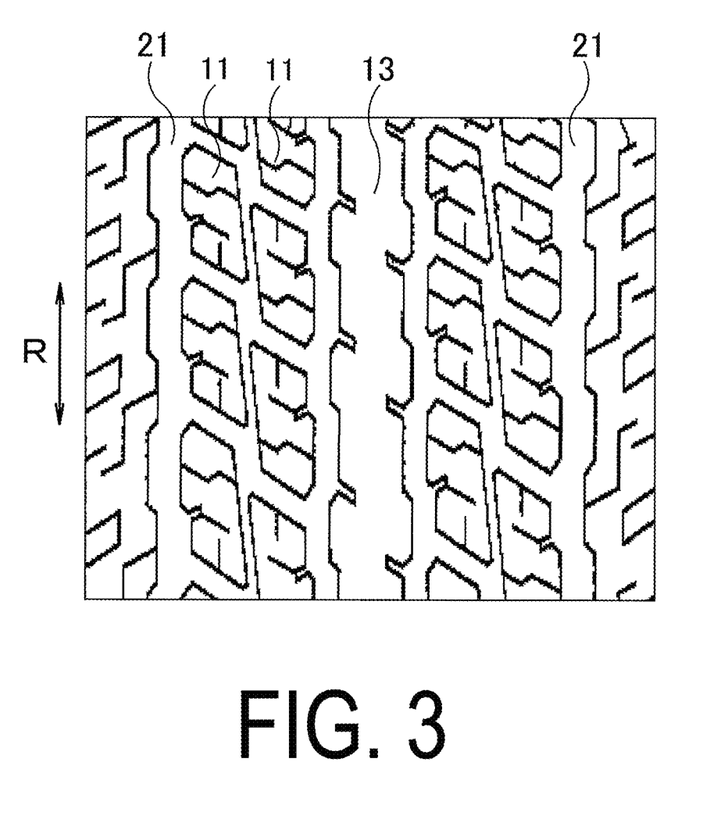
FIG. 3 is an explanatory diagram illustrating another example of a tread pattern of a pneumatic tire according to an embodiment of the present technology.

| | | Standard Example | Example 1 | Example 2 | Comparative Example 1 |
|---|---|---|---|---|---|
| NR | Part by mass | 60 | 17 | 17 | 17 |
| SBR-1 | Part by mass | 40 | 57 | 57 | 57 |
| SBR-2 | Part by mass | | | | |
| BR | Part by mass | 0 | 26 | 26 | 26 |
| CB-2 | Part by mass | 70 | 65 | 65 | 65 |
| Oil | Part by mass | 30 | 12 | 12 | 12 |
| Vulcanization accelerator-1 Ma | Part by mass | 1.2 | 1.8 | 1.8 | 1.8 |
| Vulcanization accelerator-2 Ma | Part by mass | 0.1 | 0.1 | 0.1 | 0.1 |
| Sulfur Ms | Part by mass | 1.5 | 1.5 | 1.5 | 1.5 |
| Average Tg | °C. | −61 | −69 | −69 | −69 |
| Compounded ratio Ma/Ms | — | 0.9 | 1.3 | 1.3 | 1.3 |
| Rubber hardness | — | 59 | 67 | 67 | 67 |
| Tread pattern | — | FIG. 3 | FIG. 3 | FIG. 2 | FIG. 3 |
| Tread groove depth | mm | 9 | 13 | 13 | 9 |
| Cut and chipping resistance | Index value | 100 | 106 | 106 | 108 |
| Wear resistance | Index value | 100 | 111 | 111 | 102 |
| tan δ (60° C.) | Index value | 100 | 98 | 98 | 104 |
| Travel failure properties over poor roads | Index value | 100 | 98 | 106 | 95 |

| | | Comparative Example 2 | Comparative Example 3 | Comparative Example 4 | Comparative Example 5 |
|---|---|---|---|---|---|
| NR | Part by mass | 17 | 17 | 17 | 0 |
| SBR-1 | Part by mass | 57 | 57 | | 70 |
| SBR-2 | Part by mass | | | 57 | |
| BR | Part by mass | 26 | 26 | 26 | 30 |
| CB-2 | Part by mass | 65 | 65 | 65 | 65 |
| Oil | Part by mass | 30 | 0 | 12 | 12 |
| Vulcanization accelerator-1 Ma | Part by mass | 1.8 | 1.8 | 1.8 | 1.8 |
| Vulcanization accelerator-2 Ma | Part by mass | 0.1 | 0.1 | 0.1 | 0.1 |
| Sulfur Ms | Part by mass | 1.5 | 1.5 | 1.5 | 1.5 |
| Average Tg | °C. | −69 | −69 | −39 | −70 |
| Compounded ratio Ma/Ms | — | 1.3 | 1.3 | 1.3 | 1.3 |
| Rubber hardness | — | 58 | 72 | 67 | 67 |
| Tread pattern | — | FIG. 3 | FIG. 3 | FIG. 3 | FIG. 3 |
| Tread groove depth | mm | 13 | 13 | 13 | 13 |
| Cut and chipping resistance | Index value | 102 | 103 | 103 | 101 |
| Wear resistance | Index value | 94 | 110 | 95 | 108 |
| tan δ (60° C.) | Index value | 96 | 100 | 91 | 97 |
| Travel failure properties over poor roads | Index value | 108 | 91 | 98 | 98 |

| | | Comparative Example 6 | Comparative Example 7 | Comparative Example 8 |
|---|---|---|---|---|
| NR | Part by mass | 30 | 0 | 80 |
| SBR-1 | Part by mass | 70 | 90 | 10 |
| SBR-2 | Part by mass | | | |
| BR | Part by mass | 0 | 10 | 10 |
| CB-2 | Part by mass | 65 | 65 | 65 |
| Oil | Part by mass | 12 | 12 | 12 |
| Vulcanization accelerator-1 Ma | Part by mass | 1.8 | 1.8 | 1.8 |
| Vulcanization accelerator-2 Ma | Part by mass | 0.1 | 0.1 | 0.1 |
| Sulfur Ms | Part by mass | 1.5 | 1.5 | 1.5 |
| Average Tg | °C. | −57 | −59 | −68 |
| Compounded ratio Ma/Ms | — | 1.3 | 1.3 | 1.3 |
| Rubber hardness | — | 67 | 67 | 66 |
| Tread pattern | — | FIG. 3 | FIG. 3 | FIG. 3 |
| Tread groove depth | mm | 13 | 13 | 13 |
| Cut and chipping resistance | Index value | 104 | 101 | 109 |
| Wear resistance | Index value | 95 | 99 | 112 |

TABLE 1-continued

| | | | | |
|---|---|---|---|---|
| tan δ (60° C.) | Index value | 95 | 95 | 100 |
| Travel failure properties over poor roads | Index value | 98 | 98 | 94 |

TABLE 2

| | | Comparative Example 9 | Comparative Example 10 | Comparative Example 11 |
|---|---|---|---|---|
| NR | Part by mass | 17 | 17 | 17 |
| SBR-1 | Part by mass | 57 | 57 | 57 |
| BR | Part by mass | 26 | 26 | 26 |
| CB-1 | Part by mass | 65 | | |
| CB-2 | Part by mass | | | 55 |
| CB-3 | Part by mass | | 65 | |
| Oil | Part by mass | 12 | 8 | 2 |
| Vulcanization accelerator-1 Ma | Part by mass | 1.8 | 1.8 | 1.8 |
| Vulcanization accelerator-2 Ma | Part by mass | 0.1 | 0.1 | 0.1 |
| Sulfur Ms | Part by mass | 1.5 | 1.5 | 1.5 |
| Average Tg | ° C. | −69 | −69 | −69 |
| Compounded ratio Ma/Ms | — | 1.3 | 1.3 | 1.3 |
| Rubber hardness | — | 67 | 66 | 66 |
| Tread pattern | — | FIG. 3 | FIG. 3 | FIG. 3 |
| Tread groove depth | mm | 13 | 13 | 13 |
| Cut and chipping resistance | Index value | 108 | 94 | 104 |
| Wear resistance | Index value | 119 | 90 | 95 |
| tan δ (60° C.) | Index value | 92 | 114 | 106 |
| Travel failure properties over poor roads | Index value | 99 | 99 | 98 |

| | | Comparative Example 12 | Comparative Example 13 | Comparative Example 14 |
|---|---|---|---|---|
| NR | Part by mass | 17 | 17 | 17 |
| SBR-1 | Part by mass | 57 | 57 | 57 |
| BR | Part by mass | 26 | 26 | 26 |
| CB-1 | Part by mass | | | |
| CB-2 | Part by mass | 75 | 65 | 65 |
| CB-3 | Part by mass | | | |
| Oil | Part by mass | 22 | 2 | 16 |
| Vulcanization accelerator-1 Ma | Part by mass | 1.8 | 0.9 | 2.3 |
| Vulcanization accelerator-2 Ma | Part by mass | 0.1 | 0.1 | 0.1 |
| Sulfur Ms | Part by mass | 1.5 | 1.5 | 1.5 |
| Average Tg | ° C | −69 | −69 | −69 |
| Compounded ratio Ma/Ms | — | 1.3 | 0.7 | 1.6 |
| Rubber hardness | — | 67 | 65 | 68 |
| Tread pattern | — | FIG. 3 | FIG. 3 | FIG. 3 |
| Tread groove depth | mm | 13 | 13 | 13 |
| Cut and chipping resistance | Index value | 109 | 108 | 100 |
| Wear resistance | Index value | 124 | 101 | 106 |
| tan δ (60° C.) | Index value | 91 | 95 | 103 |
| Travel failure properties over poor roads | Index value | 98 | 101 | 94 |

| | | Example 3 | Comparative Example 15 | Example 4 | Example 5 |
|---|---|---|---|---|---|
| NR | Part by mass | 17 | 17 | 17 | 17 |
| SBR-1 | Part by mass | 57 | 57 | 57 | 57 |
| BR | Part by mass | 26 | 26 | 26 | 26 |
| CB-1 | Part by mass | | | | |
| CB-2 | Part by mass | 65 | 70 | 65 | 65 |
| CB-3 | Part by mass | | | | |
| Oil | Part by mass | 30 | 0 | 12 | 12 |
| Vulcanization accelerator-1 Ma | Part by mass | 3.8 | 0.5 | 1.8 | 1.8 |
| Vulcanization accelerator-2 Ma | Part by mass | 0.1 | 0.1 | 0.1 | 0.1 |
| Sulfur Ms | Part by mass | 3.0 | 0.2 | 1.5 | 1.5 |
| Average Tg | ° C. | −69 | −39 | −69 | −69 |
| Compounded ratio Ma/Ms | — | 1.3 | 3.0 | 1.3 | 1.3 |
| Rubber hardness | — | 65 | 65 | 67 | 67 |

TABLE 2-continued

| Tread pattern | — | FIG. 3 | FIG. 3 | FIG. 3 | FIG. 2 |
|---|---|---|---|---|---|
| Tread groove depth | mm | 13 | 13 | 11 | 11 |
| Cut and chipping resistance | Index value | 103 | 90 | 106 | 106 |
| Wear resistance | Index value | 96 | 90 | 111 | 111 |
| tan δ (60° C.) | Index value | 104 | 91 | 98 | 98 |
| Travel failure properties over poor roads | Index value | 96 | 98 | 97 | 104 |

The types of raw materials used as indicated in Tables 1 and 2 are described below.

NR: natural rubber, TSR20

SBR-1: styrene-butadiene rubber, Nipol 1502, available from Zeon Corporation, non-oil-extended product SBR-2: styrene-butadiene rubber, Nipol NS116R, available from Zeon Corporation, non-oil-extended product BR: butadiene rubber, Nipol BR1200, available from Zeon Corporation CB-1: carbon black, SEAST 9, available from Tokai Carbon Co., Ltd., nitrogen adsorption specific surface area of 139 m$^2$/g CB-2: carbon black; SEAST 7HM, available from Tokai Carbon Co., Ltd., nitrogen adsorption specific surface area of 120 m$^2$/g CB-3: carbon black, SEAST FM, available from Tokai Carbon Co., Ltd., nitrogen adsorption specific surface area of 35 m$^2$/g Oil: Extract No. 4S (available from Showa Shell Sekiyu K.K.)

Vulcanization accelerator-1: Santocure CBS, available from Flexsys Co.

Vulcanization accelerator-2: Perkacit DPG, available from Flexsys Co.

Sulfur: Golden Flower oil treated sulfur powder, available from Tsurumi Chemical Industry, Co., Ltd.

TABLE 3

| Contents compounded in common in tread rubber composition | | |
|---|---|---|
| Anti-aging agent | 4.0 | Part by mass |
| Wax | 1.0 | Part by mass |
| Stearic acid | 1.0 | Part by mass |
| Zinc oxide | 1.0 | Part by mass |

The types of raw materials used as indicated in Table 3 are described below.

Anti-aging agent: Pilflex 13, available from NICOL LIMITED

Wax: SANNOC, available from Ouchi Shinko Chemical Industrial Co., Ltd.

Stearic acid: beads stearic acid, available from NOF Corporation

Zinc oxide: Zinc Oxide III, available from Seido Chemical Industry Co., Ltd.

As is clear from Tables 1 and 2, it was confirmed that the tread rubber composition and the pneumatic tire of Examples 1 to 5 have rubber hardness, cut and chipping resistance (tensile strength at break), wear resistance (Lambourn abrasion), heat build-up (tan δ at 60° C.), and travel failure properties over poor roads which are improved beyond conventional levels.

Additionally, as is clear from Table 1, the pneumatic tire of Comparative Example 1 is structured such that the groove depth at the shoulder portion is less than 10 mm, and thus is poor in travel failure properties over poor roads.

The pneumatic tire of Comparative Example 2 is structured such that the rubber hardness of the tread rubber is less than 65 and thus is poor in wear resistance.

The pneumatic tire of Comparative Example 3 is structured such that the rubber hardness of the tread rubber is greater than 70, and thus is poor in travel failure properties over poor roads.

The pneumatic tire of Comparative Example 4 is structured such that the average glass transition temperature of the diene rubber configuring the tread rubber composition is −65° C. or higher, and thus is poor in wear resistance and heat build-up.

The pneumatic tire of Comparative Example 5 is such that the content of natural rubber of the tread rubber composition is less than 10 mass %, and thus is poor in cut and chipping resistance.

The pneumatic tire of Comparative Example 6 is structured such that the content of butadiene rubber of the tread rubber composition is less than 20 mass % and such that the average glass transition temperature of the diene rubber is −65° C. or higher. Thus, the pneumatic tire is poor in wear resistance and heat build-up is high.

The pneumatic tire of Comparative Example 7 is structured such that the content of natural rubber of the tread rubber composition is less than 10 mass %, such that the content of styrene-butadiene rubber is greater than 70 mass %, such that the content of butadiene rubber is less than 20 mass %, and such that the average glass transition temperature of the diene rubber is −65° C. or higher. Thus, the pneumatic tire is poor in cut and chipping resistance and heat build-up is high.

The pneumatic tire of Comparative Example 8 is structured such that the content of natural rubber of the tread rubber composition is greater than 30 mass %, such that the content of styrene-butadiene rubber is less than 50 mass %, and such that the content of butadiene rubber is less than 20 mass %. Thus, the pneumatic tire is poor in travel failure properties over poor roads.

As is clear from Table 2, the pneumatic tire of Comparative Example 9 is structured such that the nitrogen adsorption specific surface area of carbon black compounded in the tread rubber composition is greater than 130 m$^2$/g, and thus heat build-up is high.

The pneumatic tire of Comparative Example 10 is structured such that the nitrogen adsorption specific surface area of carbon black compounded in the tread rubber composition is less than 70 m$^2$/g, and thus is poor in cut and chipping resistance and wear resistance.

The pneumatic tire of Comparative Example 11 is structured such that the compounded amount of carbon black of the tread rubber composition is less than 60 parts by mass, and thus is poor in wear resistance.

The pneumatic tire of Comparative Example 12 is structured such that the compounded amount of carbon black of the tread rubber composition is greater than 70 parts by mass, and thus heat build-up is high.

The pneumatic tire of Comparative Example 13 is structured such that the ratio Ma/Ms of the compounded amount Ma of the vulcanization accelerator to the compounded amount Ms of sulfur in the tread rubber composition is less than 1.0, and thus heat build-up is high.

The pneumatic tire of Comparative Example 14 is structured such that the ratio Ma/Ms of the compounded amount of the vulcanization accelerator to compounded amount of the sulfur in the tread rubber composition is greater than 1.3, and thus is poor in cut and chipping resistance and travel failure properties over poor roads.

The pneumatic tire of Comparative Example 15 is structured such that the compounded amount Ms of sulfur in the tread rubber composition is less than 0.5 part by mass and such that the ratio Ma/Ms of the compounded amount of the vulcanization accelerator to the sulfur is greater than 1.3. Thus, the pneumatic tire is poor in cut-chip resistance and wear resistance, and heat build-up is high.

The invention claimed is:

1. A pneumatic tire, comprising:
a tread rubber with a groove depth at a shoulder portion that comes into contact with a road surface of 10 mm or greater; wherein
a rubber composition of the tread rubber contains:
60 to 70 parts by mass of carbon black having a nitrogen adsorption specific surface area of 95 to 130 m²/g, 1.5 to 3.0 parts by mass of sulfur, from greater than 0 parts by mass to 30 parts by mass or less of oil, and a vulcanization accelerator per 100 parts by mass of diene rubber including 50 to 70 mass % of styrene-butadiene rubber, 20 to 30 mass % of butadiene rubber, and 10 to 30 mass % of natural rubber;
the diene rubber has an average glass transition temperature of −65° C. or lower;
a ratio Ma/Ms of a compounded amount Ma parts by mass of the vulcanization accelerator to a compounded amount Ms parts by mass of the sulfur is 1.1 to 1.3, the compounded amount Ma of the vulcanization accelerator being a total vulcanization accelerator content in the rubber composition;
the rubber composition of the tread rubber is formed without silica; and
the tread rubber has a rubber hardness of 65 to 70 at 20° C.

2. The pneumatic tire according to claim 1, wherein 1.0 to 3.0 parts by mass of the sulfur is compounded per 100 parts by mass of the diene rubber.

3. The pneumatic tire according to claim 1, wherein the tread rubber comprises a ground contact surface consisting of block-shaped land portions defined by grooves continuously provided in circumferential and width directions of the tire.

4. The pneumatic tire according to claim 2, wherein the tread rubber comprises a ground contact surface consisting of block-shaped land portions defined by grooves continuously provided in circumferential and width directions of the tire.

* * * * *